(12) United States Patent
Raghupathy et al.

(10) Patent No.: US 10,298,674 B2
(45) Date of Patent: May 21, 2019

(54) ENHANCING WI-FI AWARE PROTOCOL AND ALGORITHMS FOR DRONE CLUSTER FORMATION

(71) Applicant: INTEL CORPORATION, Santa Clara, CA (US)

(72) Inventors: Vishnusudhan Raghupathy, San Diego, CA (US); Rakesh Kalathil, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 71 days.

(21) Appl. No.: 15/352,847

(22) Filed: Nov. 16, 2016

(65) Prior Publication Data
US 2018/0139276 A1    May 17, 2018

(51) Int. Cl.
*H04L 29/08* (2006.01)
*H04W 40/24* (2009.01)
*H04W 52/02* (2009.01)
*H04W 84/12* (2009.01)
*H04B 7/0452* (2017.01)
*H04W 84/00* (2009.01)

(52) U.S. Cl.
CPC ....... *H04L 67/1061* (2013.01); *H04W 40/244* (2013.01); *H04W 52/0209* (2013.01); *H04B 7/0452* (2013.01); *H04W 84/005* (2013.01); *H04W 84/12* (2013.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/22* (2018.01)

(58) Field of Classification Search
CPC .................. H04L 67/1061; H04W 40/244
See application file for complete search history.

(56) References Cited

U.S. PATENT DOCUMENTS

2015/0131529 A1*  5/2015  Zhou ............... H04W 84/18
                                                           370/328

OTHER PUBLICATIONS

NAN Technical Specification Version 1.0 , 2015.*
Neighbor Awareness Networking Technical Specification Version 1.0; Wi-Fi Alliance; 2015 (98 pages).

* cited by examiner

*Primary Examiner* — Kevin C. Harper
*Assistant Examiner* — Henry Baron
(74) *Attorney, Agent, or Firm* — Jason H. Vick; Sheridan Ross, PC

(57) ABSTRACT

At least three different techniques are presented that facilitate cluster formation in clusterable devices such as drones. The techniques facilitate power saving in the individual clusterable devise as well as for the entirety of the cluster. The first technique utilizes a NAN application based cluster formation decision. The second technique initiates a cluster grade merging evaluation based on a "merge allowed" field in a synchronization beacon set by the discovery engine. The third technique involves a discovery engine managing cluster formation with pre-set cluster grade information.

20 Claims, 8 Drawing Sheets

ENHANCING WI-FI AWARE PROTOCOL AND ALGORITHMS FOR DRONE CLUSTER FORMATION

TECHNICAL FIELD

An exemplary aspect is directed toward communications systems. More specifically an exemplary aspect is directed toward wireless communications systems and even more specifically to IEEE (Institute of Electrical and Electronics Engineers) 802.11 wireless communications systems. Even more specifically, exemplary aspects are at least directed toward one or more of IEEE (Institute of Electrical and Electronics Engineers) 802.11ac/an/ax/ay communications systems, 60 GHz communications systems, mmWave communications systems, IEEE 802.11TGay communications, MU-MIMO communications systems and in general any wireless communications system or protocol, including WiGig, 4G, 4G LTE, 5G and later, and the like. Exemplary aspects are further directed toward incorporating the technology discussed herein into neighbour aware networking (NAN) devices, cluster formation devices, drone clusters, IoT devices, and in general any wireless device(s).

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard and the IEEE 802.11ax standard.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Millimeter wave (mmWave) wireless technology generally corresponds to the portion of the radio spectrum between 30 GHz to 300 GHz, with corresponding wavelengths between one and ten millimeters. For wireless communications, mmWave currently corresponds to bands of spectrum near 38 GHz, 60 GHx and 94 GHz, and in particular to bands between 70 GHz and 90 GH.

Unmanned Aerial Vehicles (UAVs or drones) are becoming far more frequently used by government, corporations and private parties. Drones can be especially practical in scenarios where humans could be at risk or drones are more efficient than manned counterparts. Multi-drone systems exist that partner a plurality of drones to operate as a homogeneous "system" to more efficiently and economically complete a task as compared to single drone.

Drones can communicate over one or more wireless networks as listed above. Additionally, drones can communicate with one another over one or more networks where these networks can be grouped into clusters. Within each of these clusters, only the drone designated as the cluster head would have network connections outside of the cluster. The cluster head is then equipped to disseminates data to the other drones in the cluster by broadcasting to the other drones or nodes within the cluster.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
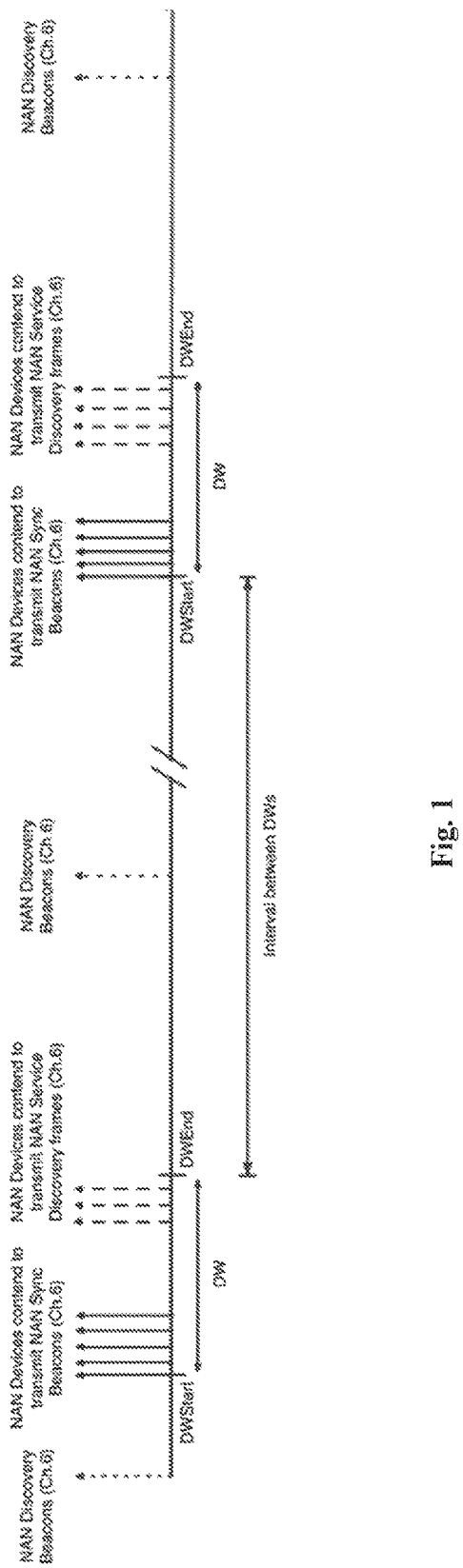
FIG. 1 illustrates an exemplary wireless device (such as station (STA) and/or access point (AP))/circuit configuration.

Exemplary embodiment can apply to NAN devices, e.g., Wi-Fi Aware devices. While the exemplary embodiments are by no means limited to Wi-Fi radio or Wi-Fi Aware, Wi-Fi radio and Wi-Fi Aware are obvious applications for this technology. Moreover, while the exemplary embodiments will be discussed in relation to a drone environment, it is to be appreciated that the techniques disclosed herein can be applied to any Wi-Fi Aware environment including, for example, IoT (Internet of Things) devices, or in general any neighbour aware network device(s) or Wi-Fi Aware device(s).

With the advent of drones, there is a need to cluster many drones to improve efficiency and manage communication through a cluster head rather than individual drones. A cluster head device in a Wi-Fi environment can make decisions for one or more of the devices within a cluster (a plurality of devices). Using this cluster head technique, devices within the cluster that are not the cluster head can rely on the cluster head (and/or the cluster head and associated network/cloud) to perform searching and/or make decisions. As will be discussed hereinafter, there are specific technological advantages associated with this configuration.

Herein are disclosed various optional techniques that use "Wi-Fi Aware" (a technology from Wi-Fi for Neighbor Awareness Networking) for cluster formation in drones or wireless devices in general. Wi-Fi Aware provides the base technology. The Wi-Fi Aware specification in its current form does not address forming purpose specific clusters like for drones navigating to a particular destination. In accordance with an exemplary embodiment, a modified Wi-Fi Aware protocol is presented that can be suitable for such operations.

Current solutions for drone cluster formation use proprietary mechanisms and radio technologies. Using Wi-Fi Aware for this purpose can at least reduce cost as drones can use existing radio protocols and spectrum rather than proprietary components.

The Wi-Fi Aware specification from Wi-Fi Alliance provides the basic infrastructure for proximity detection and cluster formation. However, the Wi-Fi Aware specification does not provide algorithms or techniques to determine/decide suitable clusters and the merging of the clusters.

One exemplary embodiment uses Wi-Fi Aware to exchange some specific information and specific settings to enable merging of drone clusters. In accordance with one exemplary drone-type environment, data such as flight information and other destination related details can be used for making cluster merging decisions. Examples of destination related details include time of flight, whether the drones can fly together, departure time information, arrival time information, priority information and in general any data related to the device itself, payload and/or flight information. This information can optionally be supplemented or replaced with information from a server to assist with making the cluster merging decisions. Alternatively, or additionally, merging of clusters may be based on one or more of destination coordinates/priorities/capabilities of devices, etc., but are not limited thereto. For example, drones with supersonic capabilities might not merge with normal drones with a higher cluster grade.

As discussed, known solutions use proprietary communication methods. An exemplary embodiment uses Wi-Fi Aware and is based on Wi-Fi standard(s) that can be easily adopted. Wi-Fi Aware is a power efficient mechanism in itself. Utilizing one or more of the techniques discussed herein to form bigger clusters can further enhance power efficiency and power savings in drones, drone clusters, or other devices.

Wi-Fi Aware based big clusters are more power efficient as they distribute cluster management and communication across all devices in the cluster. Furthermore, using a standards based Wi-Fi solution can be cost efficient for drones that already have Wi-Fi chipsets.

The Wi-Fi Aware Standard can be downloaded from wi-fi.org/discover-wi-fi/wi-fi-aware and is incorporated herein by reference in its entirety. Briefly, Wi-Fi Aware is a forthcoming update to the ubiquitous wireless protocol that will add beacon-like features for discovering and connecting to nearby devices. The protocol is designed to be power efficient and an always on feature.

Some Important Functional Aspects of Wi-Fi Aware

BEACONS for Device discovery (See Wi-Fi Aware NAN specification 1.0) (See FIG. 1) Below are two examples of the main API's associated with the Wi-Fi Aware specification which can be used with the techniques discussed herein.

PUBLISH API: Publish(service_name, matching_filter_tx, matching_filter_rx, service_specific_info, configuration_parameters)

SUBSCRIBE API: Subscribe(service_name, matching_filter_rx, matching_filter_tx, service_specific_info, configuration_parameters)

Figure 2:
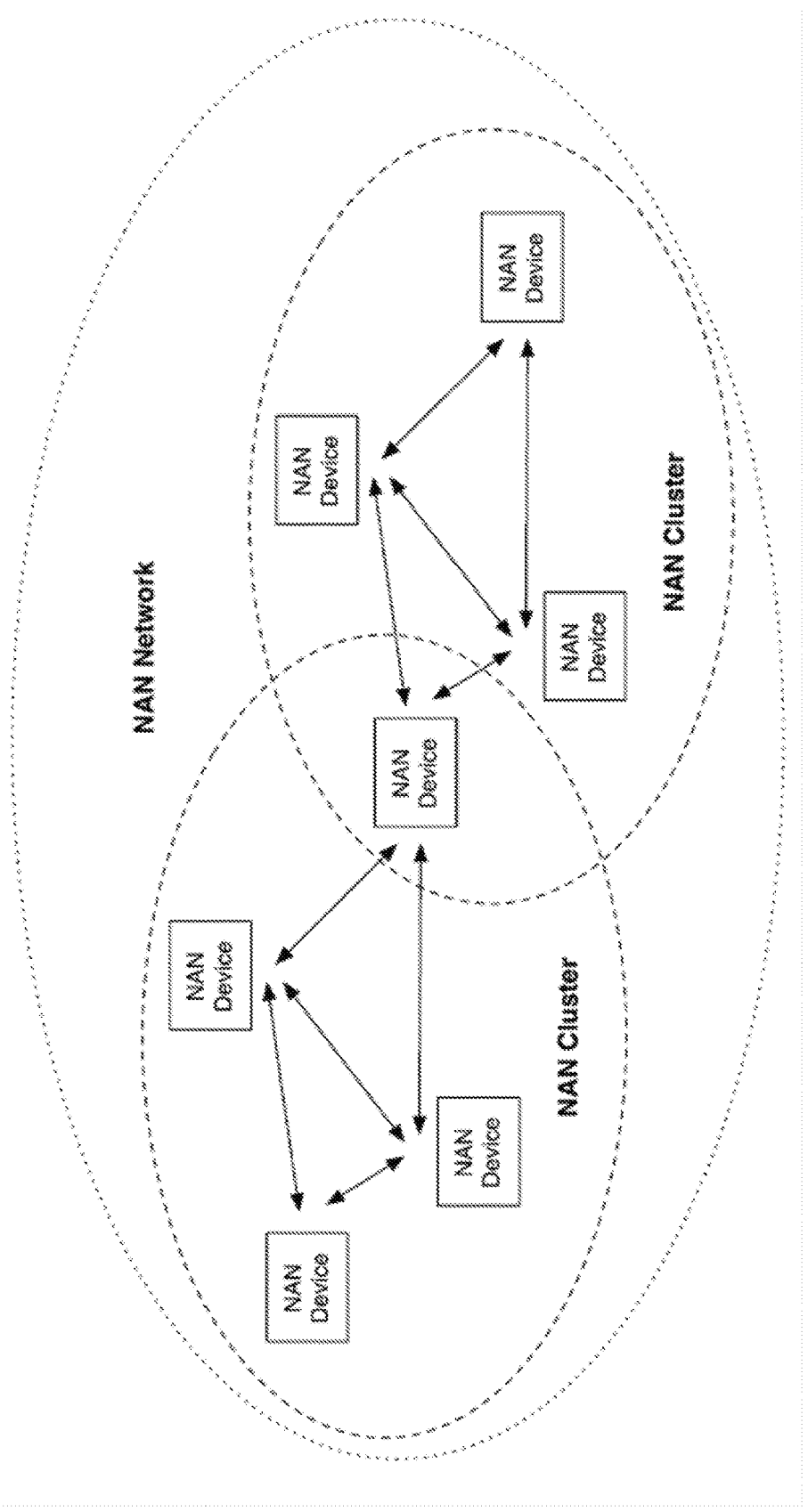
FIG. 2 illustrates NAN network clustering.

As shown in FIG. 2, a NAN device may choose to participate in more than one NAN Cluster, e.g., to quickly discover all services offered by the NAN devices of one or more of the NAN clusters within range.

NAN Cluster Grade as specified in the standard

Each NAN Cluster shall have a Cluster Grade (CG) that, as directed by the standard, is determined as follows:

$$CG = 2^{64} * A1 + A2$$

where A1 is the Master Preference of the Anchor Master of the NAN Cluster and A2 is the 8-octet TSF (Time Synchronization Function—See in General Section 3 of the standard) value of the NAN Cluster.

The standard further specifies NAN Cluster Merging as follows:

Two NAN Clusters merge NAN Devices when one NAN Cluster discovers the existence of another NAN Cluster and the clusters converge into a common NAN Cluster.

A NAN Device that operates in a NAN Cluster shall determine the CG of its own NAN Cluster, scan for other NAN Clusters and determine the CGs of the discovered NAN Clusters.

An exemplary embodiment manages the enabling or disabling of the determination of the cluster grade (CG) to assist with merging decisions.

Three different techniques are proposed to make these cluster formation decisions. A first exemplary technique operates at an application layer. A second exemplary technique operates at a protocol stack layer. A third exemplary technique can, for example, be hard coded, such as in a FPGA (Field Programmable Gate Array) or other circuit. Each of these various techniques have associated pros and cons as discussed herein.

First Technique—NAN Application Based Cluster Formation Decision

This exemplary embodiment will be discussed in relation to FIGS. 3-4 and has the CG based cluster merging turned off by default and uses a specific service ID to activate the CG based cluster merging feature. The exemplary technique provides an API to an application to activate or deactivate the Wi-Fi Aware based merging.

Figure 3:
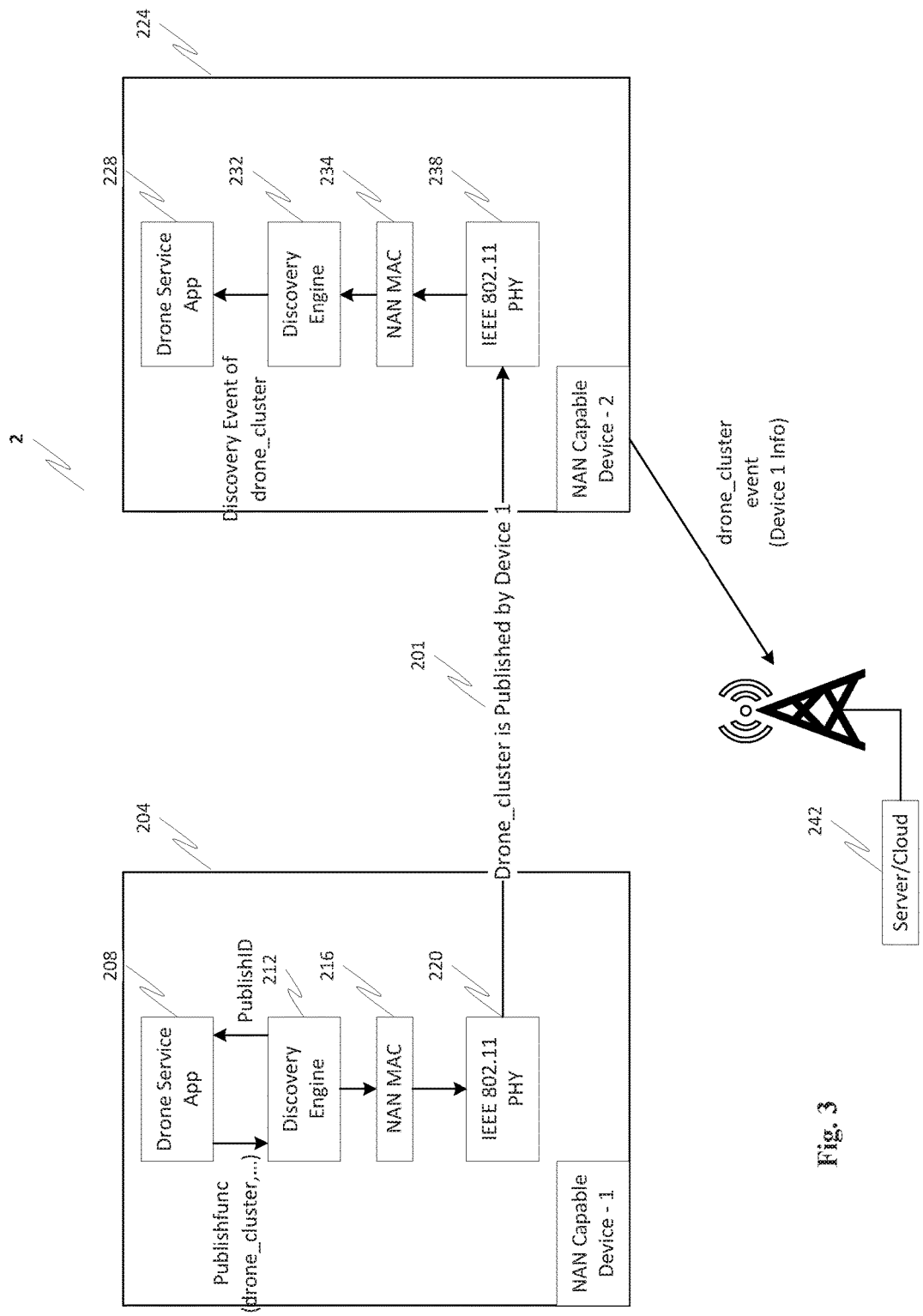
FIG. 3 illustrates exemplary NAN capable devices and exemplary operation thereof.
Figure 4:
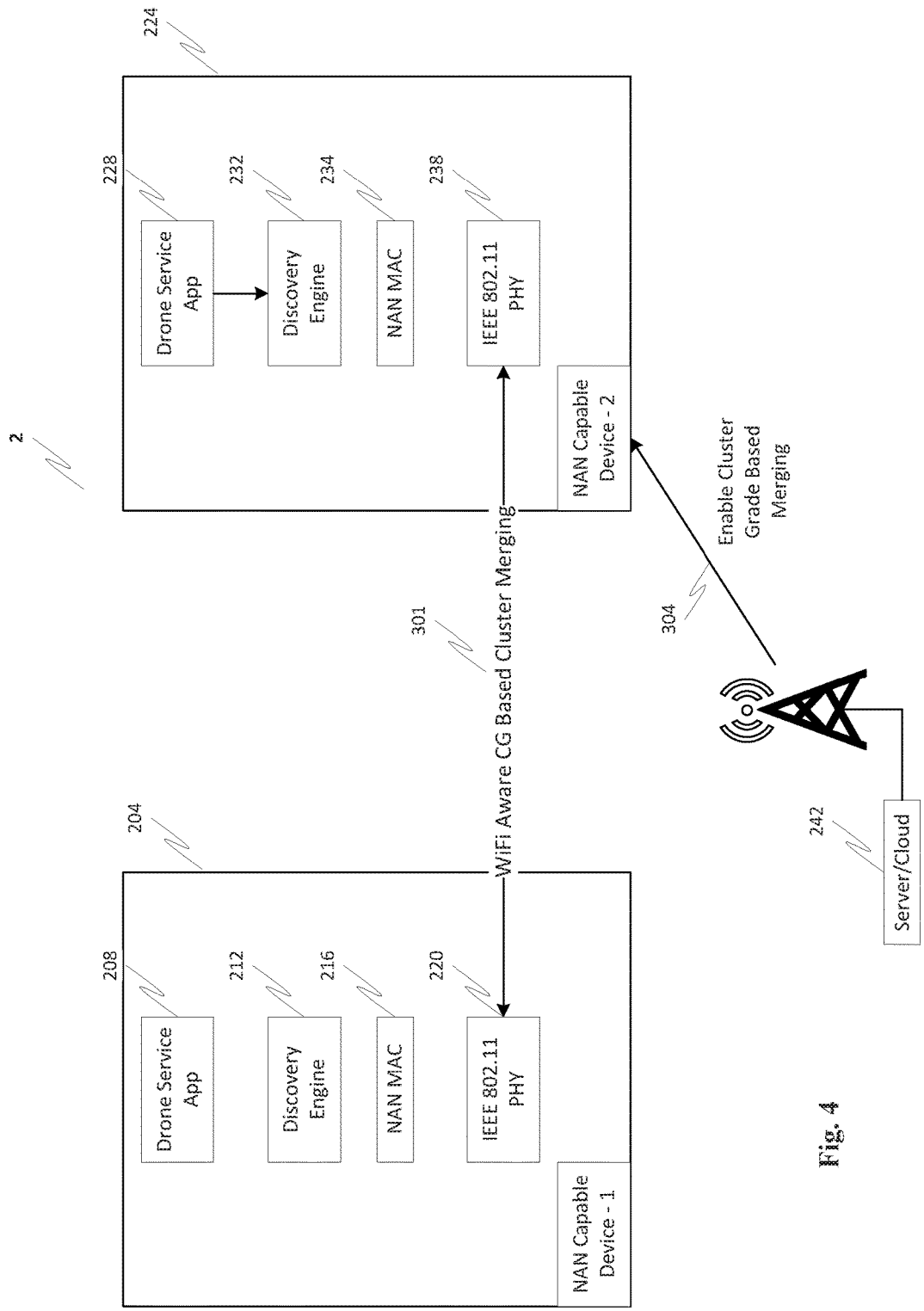
FIG. 4 illustrates exemplary NAN capable devices and exemplary operation thereof.

FIGS. 3-4 include wireless devices, such as Wi-Fi Aware devices/drones 204 and 224. Each respective exemplary device includes a drone service application 208/228, a discovery engine 212/232, a NAN MAC 216/234, and an IEEE 802.11 PHY 220/238. The systems 2 can optionally include one or more servers/cloud resources 242 in communication with the device(s) 204/224.

In accordance with the exemplary embodiment, each cluster of drones is provided with a service ID (referred to as "drone_cluster"—See FIG. 3) which can be unique to the drones or the UAVs. Here, the default cluster merging mechanism based on the Cluster Grade in the Wi-Fi Aware standard may be turned off initially.

When a drone from one cluster, e.g., 224, detects a "drone_cluster" service ID published 201 by another NAN capable device 204, the application layer of drone 224, based on the configuration, either initiates a P2P (Peer-to-Peer) connection (See FIG. 4—301) with the other drone(s) 204 and collects service information, or directly enables the cluster merging based on the Cluster Grade.

Upon obtaining the service information (including, for example, information about flight path, details about merging allowed, etc.) the drone 224 can either decide on its own if merging should be allowed with drone 204, or drone 224 can contact a server/cloud 242 (for example over an LTE or other connection) and send this information to the server 242 to let the server/cloud make the merging decision. Based on the response 304 from the server 242, the drone 224 can enable merging and become a part of the bigger cluster associated with drone 204.

In this algorithm, each drone can make the decision regarding clustering at the application level and one by one drones merge onto the cluster to make a bigger cluster.

Exemplary advantages of this technique are that the application level decision for merging clusters provides flexibility and scalability for different scenarios. The technique also allows for complex algorithms on the server side to determine the merging of clusters. However, as this technique can be performed at the application level, it may not be as power efficient as other techniques discussed herein.

Second Technique—Initiating Cluster Grade Merging Evaluation Based on a "Merge Allowed" Field in a Synchronization Beacon Set by the Discovery Engine In accordance with this exemplary technique, a new field is introduced that allows efficient and flexible management of the CG based merging mechanism.

In accordance with this exemplary embodiment, a new field in the "Discovery Frame" of Wi-Fi Aware protocol is introduced. The Cluster Grade based merging algorithm can be turned on/off based on this field. Furthermore, this field can be set by the Discovery Engine of a NAN device based on the decision to merge.

Below is the current Discover Frame format in the Wi-Fi Aware standard:

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | Wi-Fi Alliance specific OUI |
| OUI Type | 1 | 0x13 | Identifying the type and version of the NAN |
| NAN Attributes | Variable | Variable | One or more NAN Attributes |

The new Discover Frame format usable with this exemplary embodiment can be configured as follows, although it is to be appreciated the size and name can be changed without effecting the operation thereof. Here, the new fields, Merge Allowed and Merge Attributes are shown in bold:

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | Wi-Fi Alliance specific OUI |
| OUI Type | 1 | 0x13 | Identifying the type and version of the NAN |
| NAN Attributes | Variable | Variable | One or more NAN Attributes |
| Merge Allowed | 1 | Variable | Anchor master sets the bit when cluster merging is allowed for entire cluster |
| Merge Attributes | Variable | Variable | Information Field to be used when Merge Allowed is set |

The Merge Allowed field can have, for example, a size of 1 octet with it specifying that the anchor master, also known as cluster head, sets the bit when cluster merging is allowed for the entire cluster. The Merge Attributes field specifies that the information field is to be used when Merge Allowed is set.

An example of Merge Attributes can be if the cluster head searches for a Wi-Fi Access Point, then it can inform the entire cluster to select/connect to the access point by setting the Merge Allowed field and setting Access Point Details info in the Merge Attributes field.

Another example could be in a Wi-Fi Aware cluster of mobile phones/IoT Devices, where the cluster head might search for a PLMN (Public Land Mobile Network), and, if found, can set the Merge Allowed field and set PLMN information in the Merge Attributes field. This allows power savings for entire cluster for the case of Out Of Service.

In this technique, similar to the first technique, the CG based merging can be disabled when a cluster is formed. This helps save power for drones. When the CG merge is turned off, this also turns off passive scanning which saves further power in the entire cluster. However, at this time the cluster cannot merge with another cluster. For merging, the exemplary technique allows the Cluster/Anchor Master to perform passive scanning. When the anchor master discovers a drone from another cluster, the anchor master sets the bit "merge allowed" in the Synchronization Beacon. When the cluster members detect this bit as being set, the cluster members enable CG based merging and passive scanning to merge the clusters into one.

Some of the exemplary advantages of this technique are that it is more power efficient compared to the first technique. However, the technique relies upon the Cluster/Anchor Master to detect and decide on whether to merge.

Third Technique—Discovery Engine Based Cluster Formation with Pre-Set Cluster Grade In accordance with this exemplary embodiment, the technique provides an API for the application to set the cluster grade based on an application algorithm.

In accordance with this exemplary embodiment, the cluster grade for each drone cluster is predefined. Once the cluster grades are decided based on, for example, based on the route and flight path information, (or in general any information associated with the cluster) the Wi-Fi Aware based CG merging mechanism will automatically merge the lower grade path drones to higher grade path drones.

Figure 5:
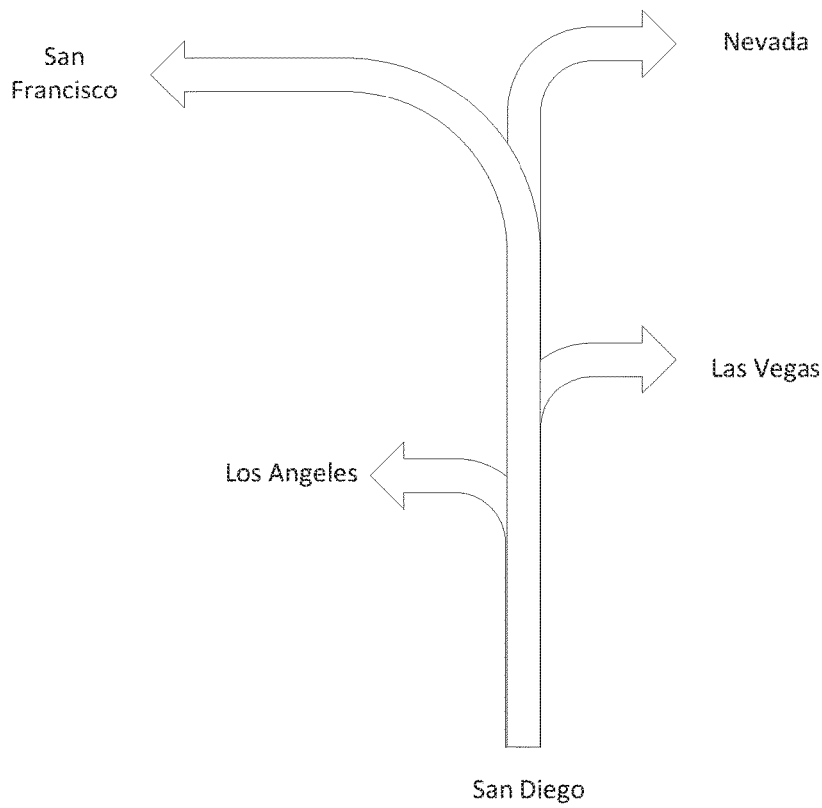
FIG. 5 illustrates exemplary flight path information and how a cluster grade can be determined.
Figure 5:
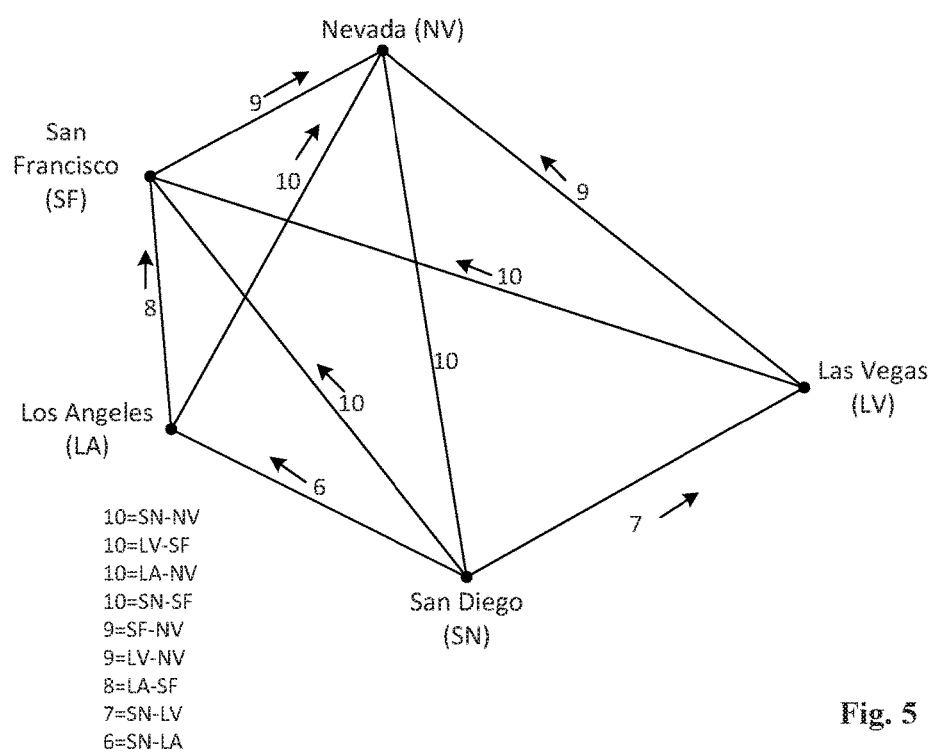

An example of setting up of cluster grade based on flight path is shown in FIG. 5. A simple process for this can be that the longest route has the highest grade and the shortest route has the smallest grade. By doing this, drones with the shorter path will merge to clusters with the longer path upon detection of proximity. Here, it is assumed that the shorter path would be a subset of the longer path. Algorithms for this technique can be based on the route information summarized in the lower left-hand portion of the figure where the highest grades are associated with the routes of length "10."

An exemplary advantage of this technique is that it is very power efficient, however, it may not be as flexible as the first technique.

Figure 6:
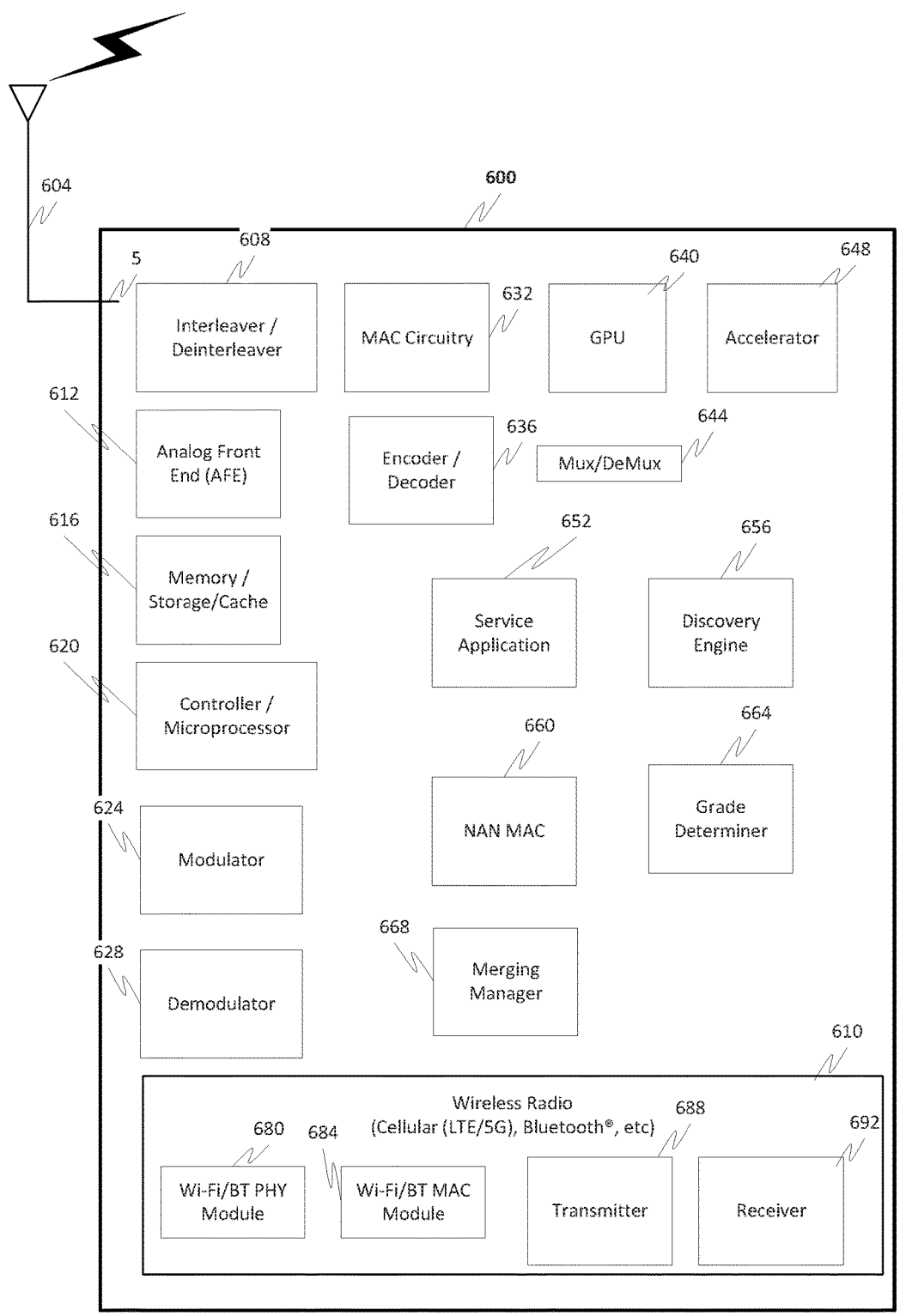
FIG. 6 illustrates an exemplary functional block diagram of a wireless device.

FIG. 6 illustrates an exemplary hardware/functional block diagram of a device 600, such as a wireless device, mobile device, access point (AP), station (STA), devices shown in FIGS. 3-4, or the like, that is adapted to implement the technique(s) discussed herein.

In addition to well-known componentry (which has been omitted for clarity), the device 600 includes interconnected elements including one or more of: one or more antennas 604 and associated antenna ports, an interleaver/deinterleaver 608, an analog front end (AFE) 612, memory/storage/cache 616, controller/microprocessor 620, MAC circuitry 632, modulator 624, demodulator 628, encoder/decoder 636, GPU 640, accelerator 648, a multiplexer/demultiplexer 644, a service application(s) 652, a discovery engine 656, a NAN MAC 660, a grade determiner 664, a merging manager 668 and wireless radio 610 components such as a Wi-Fi/BT PHY module/circuit 680, a Wi-Fi/BT MAC module/circuit 684, transmitter 668 and receiver 692. The various elements in the device 600 are connected by one or more links/connections 5 (not all shown, again for sake of clarity).

The device 600 can have one more antennas 604, for use in wireless communications such as Wi-Fi, multi-input multi-output (MIMO) communications, multi-user multi-input multi-output (MU-MIMO) communications Bluetooth®, LTE, 4G, 5G, 60 Ghz, WiGig, mmWave systems, etc. The antenna(s) 604 can include, but are not limited to one or more of directional antennas, omnidirectional antennas, monopoles, patch antennas, loop antennas, microstrip antennas, dipoles, and any other antenna(s) suitable for communication transmission/reception. In one exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 604 generally interact with the Analog Front End (AFE) 612, which is needed to enable the correct processing of the received modulated signal and signal conditioning for a transmitted signal. The AFE 612 can be functionally located between the antenna and a digital baseband system/processor in order to convert the analog signal into a digital signal for processing, and vice-versa.

The device 600 can also include a controller/microprocessor 620 in communication with a memory/storage/cache 616. The device 600 can interact with the memory/storage/cache 616 which may store information and operations necessary for configuring and transmitting or receiving the information and performing one or more portions of the techniques described herein. The memory/storage/cache 616 may also be used in connection with the execution of application programming or instructions by the controller/microprocessor 620, and for temporary or long term storage of program instructions and/or data. As examples, the memory/storage/cache 620 may comprise a computer-readable device, RAM, ROM, DRAM, SDRAM, and/or other storage device(s) and media.

The controller/microprocessor 620 may comprise a general purpose programmable processor or controller for executing application programming or instructions related to the device 600. Furthermore, the controller/microprocessor 620 can cooperate with one or more other elements in the device 600 to perform operations for configuring and transmitting information and performing operations as described herein. The controller/microprocessor 620 may include multiple processor cores, and/or implement multiple virtual processors. Optionally, the controller/microprocessor 620 may include multiple physical processors. By way of example, the controller/microprocessor 620 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 600 can further include a transmitter 668 and receiver 692 which can transmit and receive signals, respectively, to and from other wireless devices and/or access points using the one or more antennas 604. Included in the device 600 circuitry is the medium access control or MAC Circuitry 632. MAC circuitry 632 provides for controlling access to the wireless medium. In an exemplary embodiment, the MAC circuitry 632 may be arranged to contend for the wireless medium and configure frames or packets for communicating over the wireless medium.

The device 600 can also optionally contain a security module (not shown). This security module can contain information regarding but not limited to, security parameters required to connect the device to an access point or other device, or vice versa, or other available network(s), and can include WEP or WPA/WPA-2 (optionally+AES and/or TKIP) security access keys, network keys, etc. As an example, the WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

As shown in FIG. 6, the exemplary device 600 can also include a GPU 640, an accelerator 648, multiplexer/demultiplexer 644, a Wi-Fi/BT (Bluetooth®)/BLE (Bluetooth® Low Energy) PHY module 680 and a Wi-Fi/BT/BLE MAC module 684 that at least cooperate with one or more of the other components as discussed herein.

In operation, an in accordance with the first exemplary technique, the CG based cluster merging is managed in the device 600 by the service application 652 turned off by default and uses a specific service ID stored in memory 616 to activate the CG based cluster merging feature as managed by the merging manager 668. In accordance with one exemplary embodiment, each cluster of drones is provided with a service ID which can be unique to the drones or the UAVs. Here, the default cluster merging mechanism based on the Cluster Grade in the Wi-Fi Aware standard may be turned off initially.

When a drone from one cluster, and in particular the discover engine 655 detects a "drone_cluster" service ID published by another NAN capable device, the service application 652, based on the configuration, either initiates a P2P (Peer-to-Peer) connection, with the cooperation of one or more of the MACs, with the other drone(s) and collects service information, or directly enables the cluster merging with the cooperation of the merging manager 668 based on the Cluster Grade.

Upon the service application 652 obtaining the service information (including, for example, information about flight path, details about merging allowed, etc.) the drone can either decide on its own if merging should be allowed with another drone, or the drone can contact a server/cloud (for example over an LTE, 5G, or other connection) and send this information to the server/cloud to let the server/cloud make the merging decision. Based on a response from the server/cloud, the drone, in cooperation with the merging manager 668, can enable merging and become a part of the bigger cluster associated with drone.

With this exemplary technique, each drone can make the decision regarding clustering at the application level and one by one drones merge onto the cluster to make a bigger cluster.

In accordance with the second technique, initiating of a cluster grade merging evaluation is based on a "merge allowed" field in a synchronization beacon set by the discovery engine 656 and managed by the merging manager 668.

In accordance with this exemplary technique, a new field is introduced that allows efficient and flexible management of the CG based merging mechanism. In accordance with this exemplary embodiment, a new field in the "Discovery Frame" is introduced as discussed herein. The Cluster Grade based merging algorithm can be turned on/off based on this field. Furthermore, this field can be set by the discovery engine 656 of a NAN device based on the decision to merge by the merging manager 668.

In this technique, similar to the first technique, the CG based merging can be disabled when a cluster is formed. This helps to at least save power for drones. When the CG merge is turned off by the merging manager 668, this may also turn off passive scanning which saves further power in the entire cluster. However, at this time the cluster cannot merge with another cluster. For merging, the exemplary technique allows the Cluster/Anchor Master to perform passive scanning. When the anchor master discovers a drone from another cluster, the anchor master can set the bit "merge allowed" in the Synchronization Beacon. When the cluster members detect this bit as being set, the cluster members enable CG based merging and passive scanning to merge the clusters into one.

In accordance with the third technique, the discovery engine 656 makes cluster formation decisions based on a pre-set cluster grade as managed by the grade determiner 660. In accordance with this exemplary embodiment, the technique provides an API for an application/grade determiner 660 to set the cluster grade based on, for example, an application algorithm.

In accordance with this exemplary embodiment, the cluster grade for each drone cluster is predefined and managed by the grade determiner 660 and stored in memory 616. Once the cluster grades are decided based on, for example, based on the route and flight path information, (or in general any information associated with the cluster) the Wi-Fi Aware based CG merging mechanism and merging manager 668 will automatically merge the lower grade path drones to higher grade path drones. These cluster grades can be assigned, determined by the cloud/server, determined by a drone, determined by a cluster head, or the like.

An example of setting up of cluster grade based on flight path is shown in FIG. 5 as illustrated herein.

Figure 7:
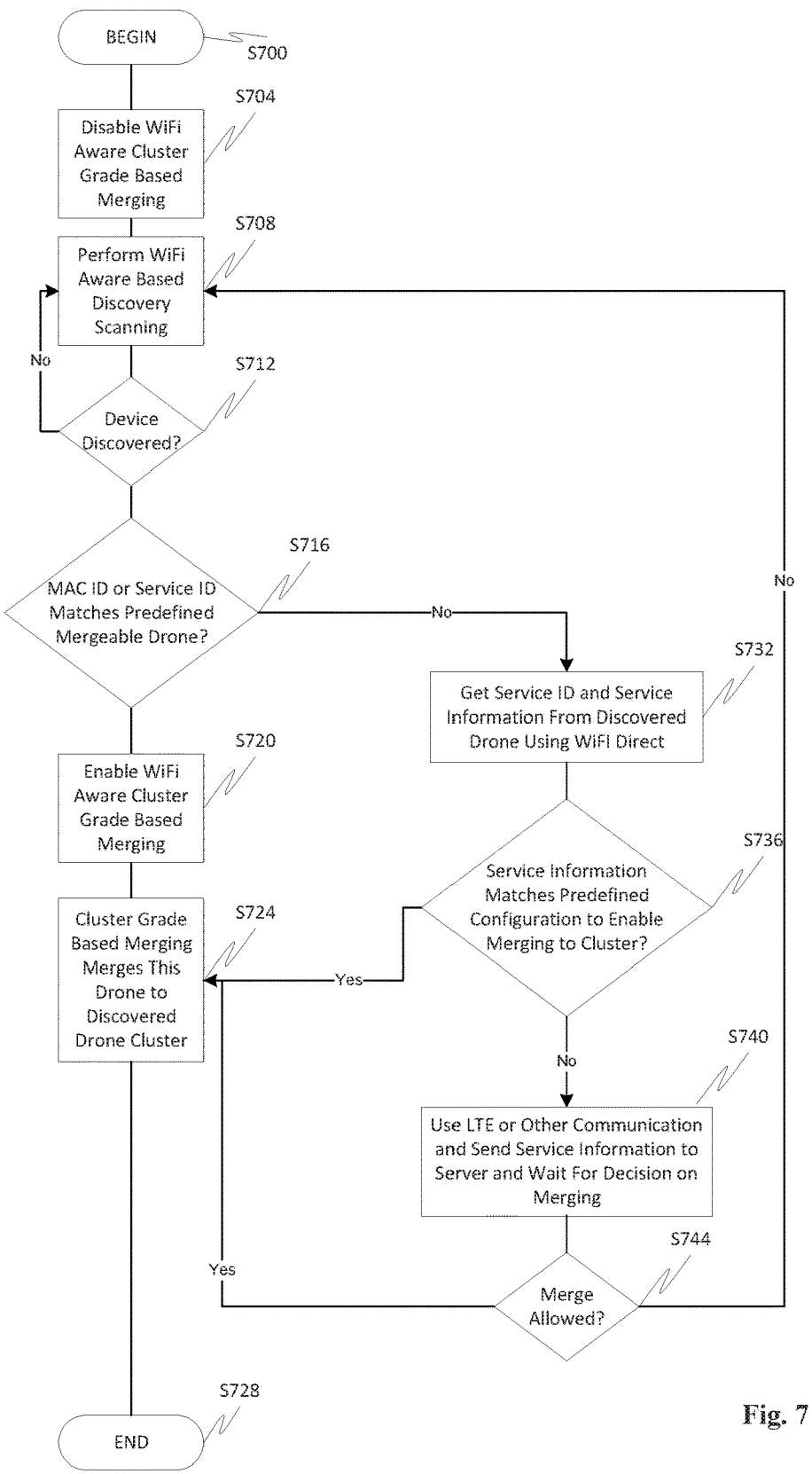
FIG. 7 illustrates a flowchart illustrating an exemplary method for cluster formation.

FIG. 7 outlines an exemplary method of cluster merging. Control begins in step S700 and continues to step S704. In step S704, WiFi Aware cluster grade merging is disabled. Next, in step S708, discovery scanning is performed. Then in step S712, a determination is made whether a device has been discovered. If a device has been discovered, control continues to step S716, with control otherwise jumping back to step S708.

In step S716, a determination is made whether a MAC ID or Service ID matches a predefined mergeable drone. If there is a match, control continues to step S720 with control otherwise continuing to step S732.

In step S720, cluster grade based merging is enabled. Next, in step S724, cluster grade based merging, based on merge information and/or attributes, merges the drone/device to a discovered drone/device cluster with control continuing to step S724 where the control sequence ends.

In step S732, a service ID is obtained as well as service information from the discovered drone/device using, for example WiFi direct or other communication protocol(s). Next, in step S736, a determination is made whether the service information matches a predefined configuration to enable merging to the discovered cluster. If there is a match, control continues to step S724 with control otherwise continuing to step S740.

In step S740, LTE, 5G, or in general any communication protocol is used to send service information to a server/cloud to wait for a decision on merging. Next, in step S744, a determination about whether a merge is allowed is performed. If a merge is allowed, control continues to step S724 with control otherwise jumping back to step S708.

Figure 8:
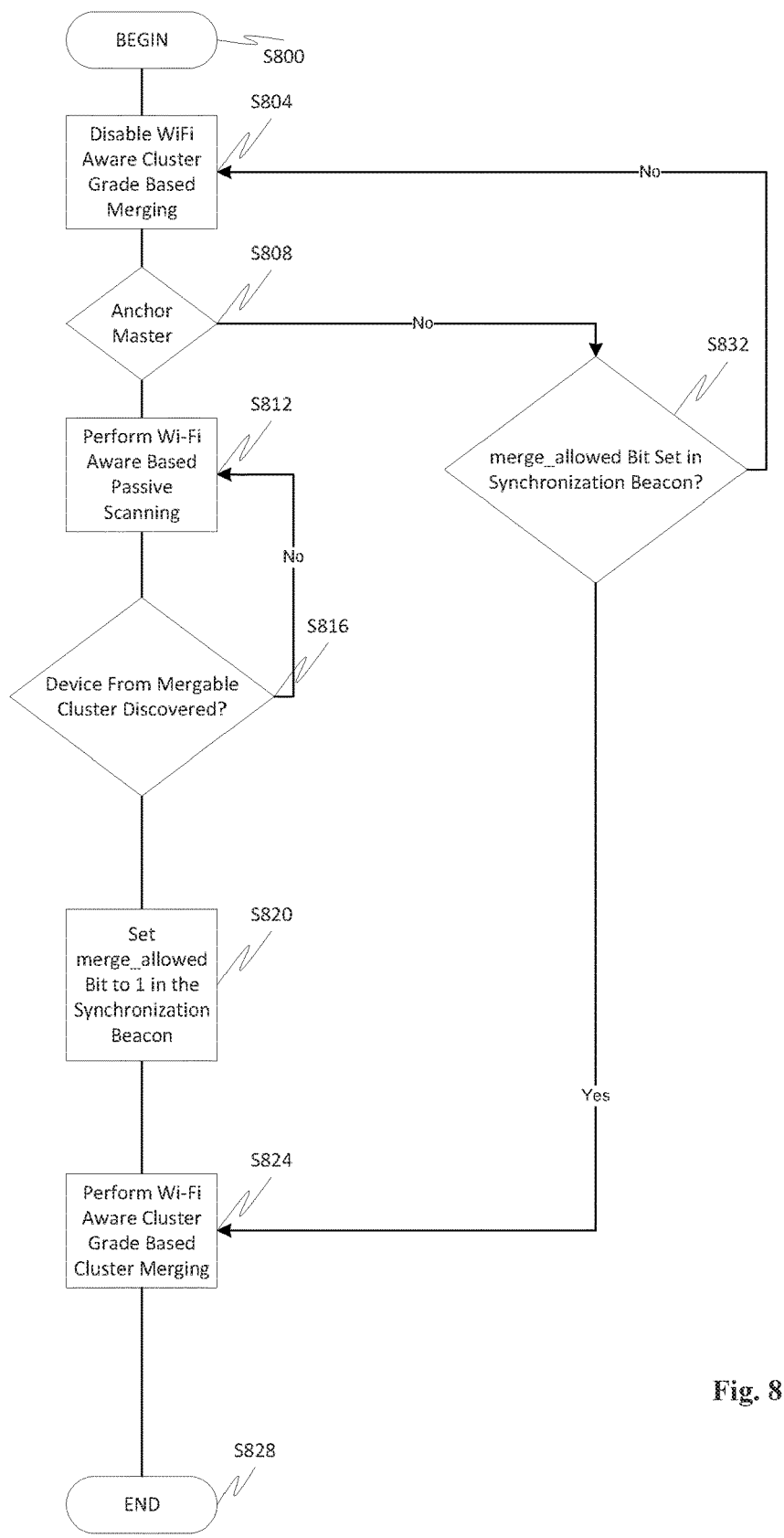
FIG. 8 illustrates a flowchart illustrating another exemplary method for cluster formation.

FIG. 8 illustrates another exemplary method for cluster grade based merging. Here, control begins in step S800 and continues to step S804. In step S804, the Wi-Fi Aware cluster grade merging is disabled. Next, a determination is made whether the device is an anchor master/cluster master. If the device is an anchor master/cluster master control continues to step S812 with control otherwise continuing to step S832.

In step S812, passive scanning is performed. next, in step S816, a determination is made whether a device from a mergeable cluster has been discovered. If a device has been discovered, control continues to step S820 with control otherwise jumping back to step S812.

In step S820, as one example, a merge allowed value is set to "yes". next, in step S824, cluster grade based cluster merging is performed with control continuing t step S828 where the control sequence ends.

in step S832, a determination is made whether merging has been indicated as being allowable in, for example, a synchronization beacon. If merging is allowed, control continues to step S824 with control otherwise jumping back to step S804.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A clusterable wireless device comprising:
- a discovery engine that disables cluster grade based merging on the device;
- a merging manager connected to the processor to execute a process to determine whether to perform cluster grade based merging for the device to another device in a cluster of devices, the merging manager enabling cluster grade based merging allowing the device to merge to the another device in the cluster of devices.

One or more of the above aspects, wherein the process is based on whether information matches a predefined mergeable drone.

One or more of the above aspects, wherein the process further comprises determining whether service information matches a predefined configuration for enabling the cluster merging.

One or more of the above aspects, wherein a transmitter communicates service information to a server and a receiver receives a merging decision back from the server.

One or more of the above aspects, wherein the process is based on merge allowed information and/or attributes.

One or more of the above aspects, wherein the merge allowed information is a merge allowed bit in a synchronization beacon.

One or more of the above aspects, wherein the process includes using a specific service identification to activate the cluster grade based cluster merging.

One or more of the above aspects, wherein the clusterable wireless device is a clusterable drone, and the another device is another clusterable wireless device in the cluster of devices.

One or more of the above aspects, wherein the process causes to be initiated initiates a Peer-to-Peer connection with the another device and collects the service identification, or directly enables the cluster merging based on the cluster grade.

A non-transitory information storage media having stored thereon one or more instructions, that when executed by one or more processors, cause a clusterable wireless device to perform a method comprising:
 disabling cluster grade based merging for the device;
 executing a process to determine whether to perform cluster grade based merging for the device to another device in a cluster of devices; and
 enabling cluster grade based merging allowing the device to merge to the another device in the cluster of devices.

One or more of the above aspects, wherein the process is based on whether information matches a predefined mergeable drone.

One or more of the above aspects, wherein the process further comprises determining whether service information matches a predefined configuration for enabling the cluster merging.

One or more of the above aspects, wherein a transmitter communicates service information to a server and a receiver receives a merging decision from the server.

One or more of the above aspects, wherein service information is communicated to a server and a merging decision is received back from the server.

One or more of the above aspects, wherein the process is based on merge allowed information and/or attributes.

One or more of the above aspects, wherein the merge allowed information is a merge allowed bit in a synchronization beacon and/or the attributes are in the synchronization beacon.

One or more of the above aspects, wherein the process includes using a specific service identification to activate the cluster grade based cluster merging.

One or more of the above aspects, wherein the process causes to be initiated a Peer-to-Peer connection with the another device and collects service information, or directly enables the cluster merging based on the cluster grade.

A clusterable wireless communications device, the device comprising:
 memory and processor circuitry configured to:
 disable cluster grade based merging of the device;
 execute a process to determine whether to perform cluster grade based merging for the device to another device in a cluster of devices; and
 enable cluster grade based merging allowing the device to merge to the another device in the cluster of devices.

One or more of the above aspects, wherein the process enhances power efficiency and power savings in drones, drone clusters, or clusterable devices.

A clusterable wireless device comprising:
 means for disabling cluster grade based merging on the device;
 means for executing a process to determine whether to perform cluster grade based merging for the device to another device in a cluster of devices, the means enabling cluster grade based merging allowing the device to merge to the another device in the cluster of devices.

One or more of the above aspects, wherein the process is based on whether information matches a predefined mergeable drone.

One or more of the above aspects, wherein the process further comprises determining whether service information matches a predefined configuration for enabling the cluster merging.

One or more of the above aspects, wherein a transmitter communicates service information to a server and a receiver receives a merging decision back from the server.

One or more of the above aspects, wherein the process is based on merge allowed information and/or attributes.

One or more of the above aspects, wherein the merge allowed information is a merge allowed bit in a synchronization beacon.

One or more of the above aspects, wherein the process includes using a specific service identification to activate the cluster grade based cluster merging.

One or more of the above aspects, wherein the clusterable wireless device is a clusterable drone, and the another device is another clusterable wireless device in the cluster of devices.

One or more of the above aspects, wherein the process causes to be initiated initiates a Peer-to-Peer connection with the another device and collects the service identification, or directly enables the cluster merging based on the cluster grade.

A method for operating a clusterable wireless device comprising:
 disabling cluster grade based merging on the device;
 executing a process to determine whether to perform cluster grade based merging of the device to another wireless device in a cluster of devices; and
 allowing the device to merge to the another device in the cluster of devices based on the determining step.

One or more of the above aspects, wherein the process is based on whether information matches a predefined mergeable drone.

One or more of the above aspects, wherein the process further comprises determining whether service information matches a predefined configuration for enabling the cluster merging.

One or more of the above aspects, wherein a transmitter communicates service information to a server and a receiver receives a merging decision back from the server.

One or more of the above aspects, wherein the process is based on merge allowed information and/or attributes.

One or more of the above aspects 4, wherein the merge allowed information is a merge allowed bit in a synchronization beacon.

One or more of the above aspects, wherein the process includes using a specific service identification to activate the cluster grade based cluster merging.

One or more of the above aspects, wherein the clusterable wireless device is a clusterable drone, and the another device is another clusterable wireless device in the cluster of devices.

One or more of the above aspects, wherein the process causes to be initiated initiates a Peer-to-Peer connection with the another device and collects the service identification, or directly enables the cluster merging based on the cluster grade.

A clusterable wireless drone comprising:
 a processor on the drone that disables a default cluster grade based merging for the drone;
 a merging manager connected to the processor and a memory to execute a merging process to determine whether to perform cluster grade based merging for the drone to another drone in a cluster of drones, the merging manager enabling cluster grade based merging allowing the drone to merge to the another drone in the cluster of drones.

One or more of the above aspects, wherein the merging into the cluster of drones allows power to be saved.

A clusterable wireless drone comprising:
 a merging manager connected to a processor and a memory on the drone to execute a merging process to determine whether to perform cluster grade based merging for the drone to another drone in a cluster of drones, the merging manager enabling cluster grade based merging allowing the drone to merge to the another drone in the cluster of drones based on the determination.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Non-limiting examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A clusterable wireless device comprising:
   a discovery engine that disables cluster grade based merging on the device for cluster-to-cluster merging;
   a merging manager connected to a processor to execute a process to determine whether to perform cluster grade based merging for the device to another device in a cluster of devices, the merging manager enabling cluster grade based merging allowing the device to merge to the another device in the cluster of devices; and
   the merging manager disabling cluster grade merging and passive scanning when the device is merged to the cluster of devices.

2. The wireless communications device of claim 1, wherein the process is based on whether an information matches a predefined mergeable drone.

3. The wireless communications device of claim 2, wherein the process further comprises determining whether a service information matches a predefined configuration for enabling the cluster merging.

4. The wireless communications device of claim 2, wherein a transmitter communicates service information to a server and a receiver receives a merging decision back from the server.

5. The wireless communications device of claim 1, wherein the process is based on merge allowed information and/or attributes.

6. The wireless communications device of claim 5, wherein the merge allowed information is a merge allowed bit in a synchronization beacon.

7. The wireless communications device of claim 1, wherein the process includes using a specific service identification to activate the cluster grade based cluster merging.

8. The wireless communications device of claim 1, wherein the clusterable wireless device is a clusterable drone, and the another device is another clusterable wireless device in the cluster of devices.

9. The wireless communications device of claim 7, wherein the process causes to be initiated initiates a Peer-to-Peer connection with the another device and collects the service identification, or directly enables the cluster merging based on the cluster grade.

10. A non-transitory information storage media having stored thereon one or more instructions, that when executed by one or more processors, cause a clusterable wireless device to perform a method comprising:
    disabling cluster grade based merging for the device for cluster-to-cluster merging;
    executing a process to determine whether to perform cluster grade based merging for the device to another device in a cluster of devices;
    enabling cluster grade based merging allowing the device to merge to the another device in the cluster of devices; and
    disabling cluster grade merging and passive scanning when the device is merged to the cluster of devices.

11. The media of claim 10, wherein the process is based on whether an information matches a predefined mergeable drone.

12. The media of claim 11, wherein the process further comprises determining whether a service information matches a predefined configuration for enabling the cluster merging.

13. The media of claim 12, wherein a transmitter communicates service information to a server and a receiver receives a merging decision from the server.

14. The media of claim 10, wherein service information is communicated to a server and a merging decision is received back from the server.

15. The media of claim 10, wherein the process is based on merge allowed information and/or attributes.

16. The media of claim 15, wherein the merge allowed information is a merge allowed bit in a synchronization beacon and/or the attributes are in the synchronization beacon.

17. The media claim 10, wherein the process includes using a specific service identification to activate the cluster grade based cluster merging.

18. The media claim 10, wherein the process causes to be initiated a Peer-to-Peer connection with the another device and collects service information, or directly enables the cluster merging based on the cluster grade.

19. A clusterable wireless communications device, the device comprising:
    memory and processor circuitry configured to:
    disable cluster grade based merging of the device for cluster-to-cluster merging;
    execute a process to determine whether to perform cluster grade based merging for the device to another device in a cluster of devices;
    enable cluster grade based merging allowing the device to merge to the another device in the cluster of devices; and
    disable cluster grade merging and passive scanning when the device is merged to the cluster of devices.

20. The device of claim 19, wherein the process enhances power efficiency and power savings in drones, drone clusters, or clusterable devices.

* * * * *